(12) United States Patent
Rosenberg

(10) Patent No.: US 8,295,192 B2
(45) Date of Patent: Oct. 23, 2012

(54) ARRANGEMENT AND METHOD RELATING TO DIGITAL SUBSCRIBE LINES

(75) Inventor: Jonas Rosenberg, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 164 days.

(21) Appl. No.: 12/524,595

(22) PCT Filed: Feb. 1, 2007

(86) PCT No.: PCT/SE2007/000092
§ 371 (c)(1),
(2), (4) Date: Jul. 27, 2009

(87) PCT Pub. No.: WO2008/094082
PCT Pub. Date: Aug. 7, 2008

(65) Prior Publication Data
US 2010/0034111 A1 Feb. 11, 2010

(51) Int. Cl.
*G01R 31/08* (2006.01)
*H04B 17/00* (2006.01)

(52) U.S. Cl. ........ 370/252; 370/389; 370/516; 370/241; 375/227; 375/219; 375/224; 375/257

(58) Field of Classification Search ............... 370/252, 370/389, 516, 241; 375/261, 227, 219, 285, 375/263, 222, 260, 344, 224, 257, 346, 355, 375/1, 119, 120; 455/63.1
See application file for complete search history.

(56) References Cited

U.S. PATENT DOCUMENTS

| | | | | | |
|---|---|---|---|---|---|
| 4,669,089 | A | * | 5/1987 | Gahagan et al. | 375/146 |
| 4,897,659 | A | * | 1/1990 | Mellon | 342/45 |
| 4,904,930 | A | * | 2/1990 | Nicholas | 324/76.21 |
| 5,319,680 | A | * | 6/1994 | Port et al. | 375/375 |
| 7,050,516 | B2 | * | 5/2006 | Currivan et al. | 375/346 |
| 7,408,980 | B2 | * | 8/2008 | Ginis | 375/219 |
| 2004/0076222 | A1 | * | 4/2004 | De Francesco et al. | 375/141 |
| 2004/0264687 | A1 | * | 12/2004 | Casey et al. | 379/413.02 |
| 2005/0220180 | A1 | * | 10/2005 | Barlev et al. | 375/222 |
| 2007/0060058 | A1 | * | 3/2007 | Shattil | 455/63.1 |

* cited by examiner

Primary Examiner — Michael Thier
Assistant Examiner — Jamal Javaid

(57) ABSTRACT

A method, arrangement, and transceiver for monitoring noise on a twisted pair cable adapted to transfer Digital Subscriber Line (DSL) signals with a given data symbol rate. A spectrum analyzer measures the power spectral density of a background or substantially pure noise signal. A switch and frequency detector determine whether the background pure noise signal includes repetitive impulse noise, and if so, a processor calculates the pulse width of the repetitive impulse noise utilizing an established relationship between the given data symbol rate and the frequency of the repetitive impulse noise given by the power spectral density measurements.

8 Claims, 8 Drawing Sheets

ARRANGEMENT AND METHOD RELATING TO DIGITAL SUBSCRIBE LINES

TECHNICAL FIELD

The present invention relates to an arrangement for monitoring noise on a twisted pair cable adapted to transfer data comprising Digital Subscriber Line signals with a given data symbol rate. The invention also relates to a Digital Subscriber Line (DSL) transceiver comprising or communicating with an arrangement as discussed above and to a method of monitoring noise received on a twisted pair cable adapted to transfer data comprising DSL signals with a given data symbol rate.

BACKGROUND

The DSL technology provides fast data transfer over ordinary telephone lines. It is very advantageous to be able to use telephone lines, i.e. an already existing infrastructure, since almost worldwide customer premises already have telephone lines installed which means that installation costs will be minimized both as far as actual installation costs are concerned and as far invested time is concerned. A disadvantage however is that a telephone line is not or was not originally intended for high speed data transfer and the status of copper wires is often unknown since they may be very old, damaged. In addition thereto they are easily affected by disturbances since they are relatively unprotected. The cables may be particularly exposed if they are so called aerials or unshielded cables. Also untwisted in-house wiring or other wiring in-house of inferior quality is generally vulnerable. It is therefore important that the telephone lines can be appropriately supervised in order to enable detection of errors and to avoid disruption of services. Measurements are important for trouble shooting. Examples on DSL technologies are ADSL (Asynchronous Digital Subscriber Line) and VDSL (Very High Speed Digital Subscriber Line), for example ADSL 2, 2+ or VDSL 2. When applying DSL technology in general and ADSL 2/2+ or VDSL 2 in particular, there are certain limitations due to the characteristics of the twisted pair cable or loop carrying the DSL signals, and it generally consists of copper. These characteristics may affect the conditions for reception/ingress of non-wanted noise. Normally the noise conditions are well known and documented for different types of twisted pair loops or pair cables. The most common form of ingress of noise into a typical twisted pair cable is noise originating from a neighbouring loop. This is called crosstalk and introduces static or semi-static colored noise on the loop. The loop may also be exposed to ingress of other types of noise, for example non-stationary types of disturbances, so called impulse noise. The impulse noise may originate from many different types of sources such as in-house dimmers, various electrical devices, internal combustion engines etc. This makes it difficult to characterize such noise since there is a large variety of sources producing the noise which means that the noise may be shaped in many different ways.

Impulse noise on a twisted pair DSL loop causes instability to the transmission of data and may lead to drop of synchronization of the DSL signalling, which in turn may result in so called re-initializations. DSL standards, cf. for example ITU-T recommendation G.992.3. 992.5, specify some typical characteristics of different types of impulse noises. There are methods known to reduce the effects of impulse noise. By applying Forward Error Correction (FEC) coding and spreading errors in time using interleaving of various depths, the DSL signal (generated by a DSL transceiver) can be protected against impulse noise. Specific combinations of parameters of the FEC and interleaver in DSL standards for the purpose of providing protection against impulse noise are called INP (Impulse Noise Protection), which is an abstract parameter that can be set on different levels.

However, when impulse noise protection is activated on a DSL transceiver both the bitrate throughput and the transmission delay will suffer therefrom. In order not to suffer from too severe performance losses, it is important to be able to limit impulse noise protection as much as possible and not use it to a larger extent than absolutely necessary. This is very difficult and it in turn means that is important to be able to characterize and detect impulse noise. It is also important to find out and locate the loops in larger networks that do suffer from impulse noise. Today it can be established if the impulse noise is repetitive, known as Repetitive Impulse Noise, REIN, and also to determine the repetitiveness, i.e. the frequency. However, the frequency is only one of the parameters characterizing impulse noise which also is characterized by other parameters, which tend to be even more important. The repetitiveness of the impulse noise can e.g. be detected using a measurement method described in "Management of a DSL copper network using built-in loop qualification tools", by Martin Nilsson, Masters Degree Project Stockholm, 2005, report ID:IR-SB-EX-0509. Due to the fact that the degree of impulse noise protection today only is based on frequency or repetitiveness of the impulse noise, there is a risk that the selection of INP will not be optimal and that therefore performances losses will be unnecessarily high, i.e. it may easily be the case that the amount of INP applied is too high.

SUMMARY

It is therefore an object of the present invention to provide an arrangement as initially referred to which enables a better characterization and detection of impulse noise. It is particularly an object of the invention to provide an arrangement through which it in an easy and uncomplicated manner becomes possible to detect and characterize and localize (trace the origin of) impulse noise. Particularly it is an object of the invention to provide an arrangement through which it becomes possible to control, in a much better manner than hitherto, the application of impulse noise protection while minimizing performance losses, i.e. to optimally control the use of impulse noise protection. It is also an object of the invention to suggest a way to easily establish which loops, for example in larger networks, that suffer from impulse noise, and to what extent, and to be able to detect whether the impulse noise is repetitive or not. It is also an object of the invention to provide an arrangement enabling the provisioning of a better basis for making decisions concerning impulse noise protection.

It is also an object of the present invention to provide a DSL transceiver through which one or more of the above mentioned objects can be fulfilled. Still further it is an object of the invention to provide a method for impulse noise detection and characterization through which one or more of the above mentioned objects can be achieved.

Therefore an arrangement as initially referred to is provided which comprises or is adapted to communicate with spectrum detection means adapted to perform and register a number of power spectral density measurements of a background, pure noise signal. It also comprises examination means adapted to establish if the background, pure noise signal comprises repetitive impulse noise, and, if so, it further comprises processing means adapted to calculate the pulse width of the repetitive impulse noise (if present), using a relationship between the given data symbol rate and the frequency of the respective impulse noise given by the power spectral density measurements.

The invention therefore also provides a transceiver comprising uplink/downlink transmitting/receiving means adapted to transmit/receive data signals with a given data symbol rate over Digital Subscriber Lines comprising or being associated with an arrangement having the features referred to above. Particularly the transceiver comprises a spectrum analyzer which, with advantage, is used to perform the power spectral density measurements according to the present invention which makes it extremely advantageous in that no additional or supplementary spectrum analyzing means are needed. Of course the inventive concept also covers embodiments with a specific external or supplementary spectrum analyzer as well.

According to the invention a method as initially referred to is therefore also provided which comprises the steps of; temporarily excluding or enabling disregarding reception of DSL signals, for example by disabling the DSL transmitter such that a pure noise signal is received (injected) and can be examined.

This means that the noise can be examined in the absence of a DSL signal. Then a power spectrum analysis of the pure noise signal is performed which provides a number of Power Spectral Density measurement values. It is established if the pure noise signal comprises repetitive impulse noise, in which case the frequency of the repetitive impulse noise is determined.

The pulse width of the impulse noise signal is then calculated using a given data symbol rate (which is characteristic for the DSL transceiver, or the arrangement), the established frequency of the impulse noise signal, and a composed, particularly empirically determined, constant.

In advantageous implementations may the calculations providing the pulse width of the repetitive pulse noise be used to control an impulse noise protection arrangement that may be provided in the transceiver or connected to the arrangement, such that performance losses can be minimized through appropriate activation of impulse noise protection (to the sufficient extent only) depending on the pulse width. The pulse width has been found to be an extremely important feature or characteristic of the impulse noise; generally the larger the pulse width, the larger the disturbance. Normally a time interval is given for performing the calculation, i.e. the behavior can be monitored by observing a short time interval or the time interval can be extended to monitor the behavior for a larger time.

It is an advantage of the invention that impulse noise can be detected, particularly that repetitive impulse noise can be detected and characterized in a better manner than hitherto. Particularly it is an advantage that a further parameter than the frequency of repetitive impulse noise can be determined, particularly the pulse width of the impulse noise. It is also an advantage that the repetitive impulse noise can be detected, characterized and described in such a manner that more well founded decisions can be made as far as impulse noise protection is concerned. Particularly it is an advantage that performance losses can be minimized by more appropriately controlled impulse noise protection by means of a better ability to characterize and recognize repetitive impulse noise. It is also an advantage that an arrangement, a transceiver and a method respectively is provided through which one or more of the above mentioned can be achieved, and which additionally is cheap and easy to implement.

BRIEF DESCRIPTION OF THE DRAWINGS

The invention will in the following be more thoroughly described, in a non-limiting manner, and with reference to the accompanying drawings, in which.

DETAILED DESCRIPTION

Figure 1:
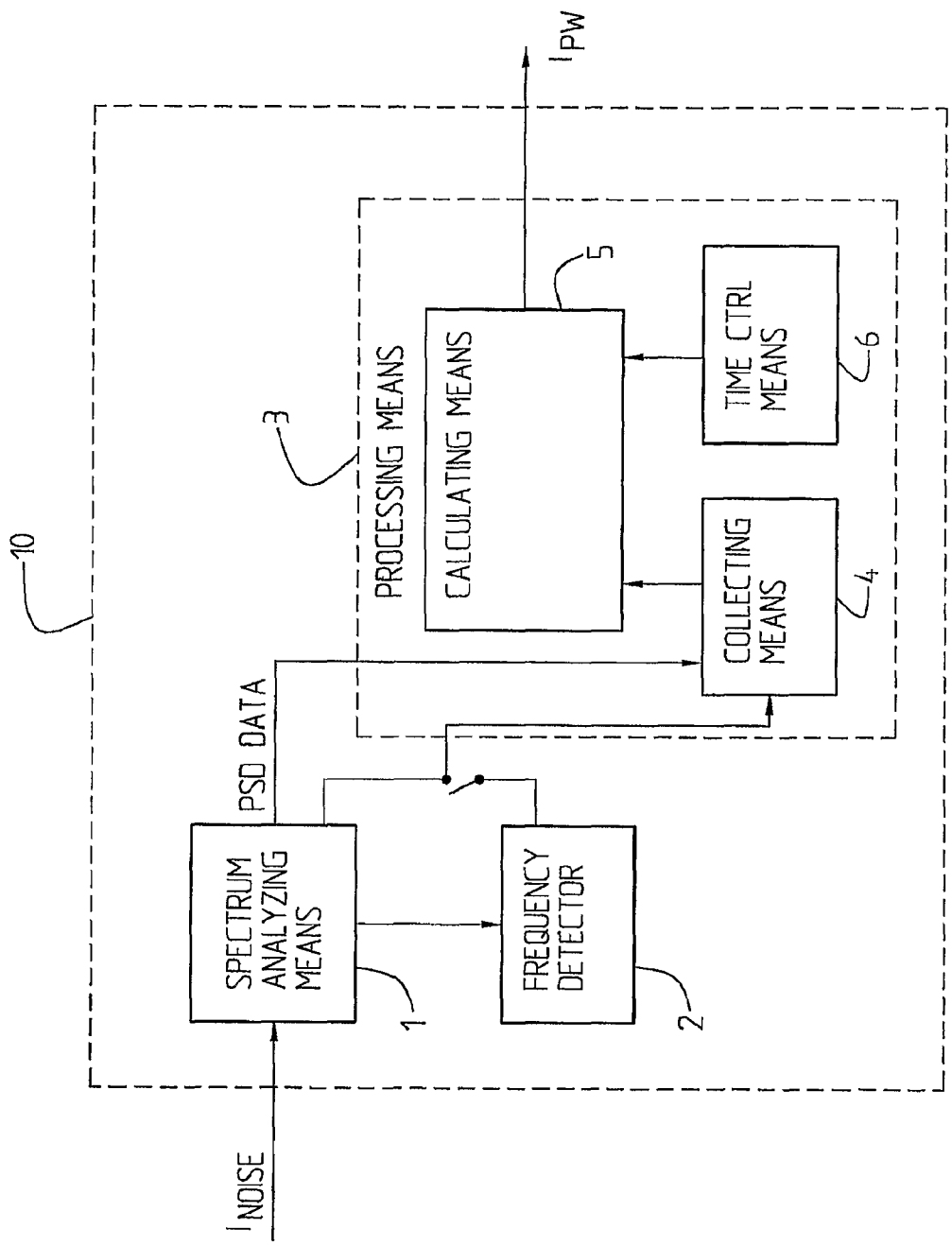
FIG. 1 is a simple block diagram of an arrangement according to one embodiment of the present invention.

In one advantageous implementation of the inventive concept the processing means comprise or communicate with time control means by means of which the observation or monitoring time interval, during which the measurements are carried out, is given. It may be done manually or automatically, depending for example on storing capacity, processing capacity etc. The processing means particularly comprise collecting means for collecting said power spectral density measurements or power spectral density measurement values, each for a discrete point in frequency. Particularly said power spectral density measurement values comprise an array of PSD (Power Spectral Density) values, one for each discrete point in frequency. The measurement data, the PSD values, are particularly marked up by the modulation scheme used for the DSL signal which generally is a Discrete Multi-Tone modulation, for example for ADSL, VDSL of different versions. (Also other, similar modulation techniques may be implemented.)

The processing means are particularly adapted to calculate the pulse width through interpreting an interference pattern, for example destructive/constructive interference, representing the relation between the given data symbol rate and pulse width. Even more particularly the relation between the given symbol rate and the pulse width comprises the (fast) Fourier Transform of the noise signal transformed into frequency domain. The relationship can particularly be expressed as a formula according to which the pulse width is given by C/(frequency spacing of the signal measurements of PSD measurement values*the given data symbol rate), wherein C is an empirically derived composite constant.

The DSL signals particularly comprise ADSL X or VDSL X (e.g. ADSL2/2+ or VDSL2) signals and the given data symbol rate is approximately 4 kHz.

It should be clear that also other data symbol rates can be applicable for particular DSL implementations. In a preferred implementation the arrangement is adapted to be provided in or associated with a DSL transceiver. Even more particularly the DSL transceiver comprises a spectrum analyzer (i.e. it is "already in place") which is extremely advantageous since it is then used for the purpose of the inventive concept. Then an extremely advantageous arrangement is obtained since there is no need to provide any dedicated spectrum analyzer and an already existing functionality can be used (for another purpose, namely that of determining pulse width of REIN).

In particular embodiments a transceiver as referred to above is provided which comprises one or more of the features described above with reference to the arrangement. Most particularly it comprises an Analog Front End for signal reception, an A/D-converter, an RX-filter for filtering out non-desired frequency bands, or measurement data, i.e. non-interesting frequency bands, converting means for performing a fast Fourier transformation from time to frequency domain of the measurement data of the received noise signal. In an extremely advantageous implementation the transceiver comprises an impulse noise protection means and protection control means adapted to control said impulse noise protection means, particularly to optimize the impulse noise protection level or the amount with which impulse noise protection is provided, depending on the determined pulse width. Particularly measurements as described above can be performed to determine or find the source of or what is the cause of repetitive impulse noise.

As discussed above the invention also provides a method, which method, according to different advantageous implementations, may include a method with steps corresponding to one or more of the advantageous embodiments discussed above with respect to the arrangement and the transceiver respectively.

FIG. 1 is a very schematical block diagram describing an arrangement 10 according to the present invention. It here comprises spectrum analyzer 1 which may be a spectrum analyzing means of the spectrum analyzer, i.e. already provided in a DSL transceiver, with which the arrangement is to be used. It is supposed that the spectrum analyzer receives a signal $I_{noise}$, which substantially is a pure noise or a background signal. This can be obtained by temporarily disabling the transmitter of the DSL transceiver to measure the loop noise. DSL technology is dominated by the Discrete Multi Tone (DMT) modulation technique. Then, according to the present invention, the receiver part of the DSL transceiver is used as a somewhat limited, for example as far as bandwidth, accuracy etc. is concerned, but still most efficient, spectrum analyzing means. It should be clear that the inventive concept is not limited to DMT or the use of the spectrum analyzer of the DSL transceiver.

The inventive concept is not limited to DMT modulation. It could e.g. also be used for OFDM (Orthogonal Frequency Division Multiplex) to the extent that the same or similar problems are produced e.g. for wireless applications. The spectrum analyzer comprises or communicates with a frequency detector 2 which establishes the frequency of the REIN (if detected as present). A switch or similar is here illustrated between the spectrum analyzing means. It should be clear that it does not have to be switch, this is merely illustrated in order to indicate that if repetitive impulse noise is detected, the frequency is established and then the PSD data is provided to collecting means 4 for purposes of the present invention. If there is no repetitive impulse noise, the frequency need not be established (switch in "off"-position). Alternatively may of course the frequency inherently be provided if REIN is found. PSD data collected by the collecting means 4 is provided to calculating means 5 (both here provided in processing means 3) which, preferably is provided with information from time control means 6 concerning the time interval during which the observation shall take place. The calculation means 5 are here supposed to contain information about the given data symbol rate, which depends on the DSL technology used, for ADSL and VDSL it may be 4 kHz. The calculation means 4 are also supposed to contain information about a constant C which actually is a composition of constant components related to the DSL transceiver and the frequency spacing, corresponding to the span in frequency for the interference period, cf. FIG. 5 below. In one embodiment the processing means are supposed to contain the collecting means 4, calculating means 5, and the time control means 6 although the processing means does not have to be provided in a specific means, FIG. 1 merely being one way of schematically illustrating the functions needed to carry out the invention.

The different means or functions may also be provided as separate functional units, or functional units combined in any appropriate manner. The output from the calculation means 4 comprises information about the pulse width ($I_{pw}$) of the REIN. As will be more thoroughly discussed below, this information can be used to control applied impulse noise protection.

Figure 2:
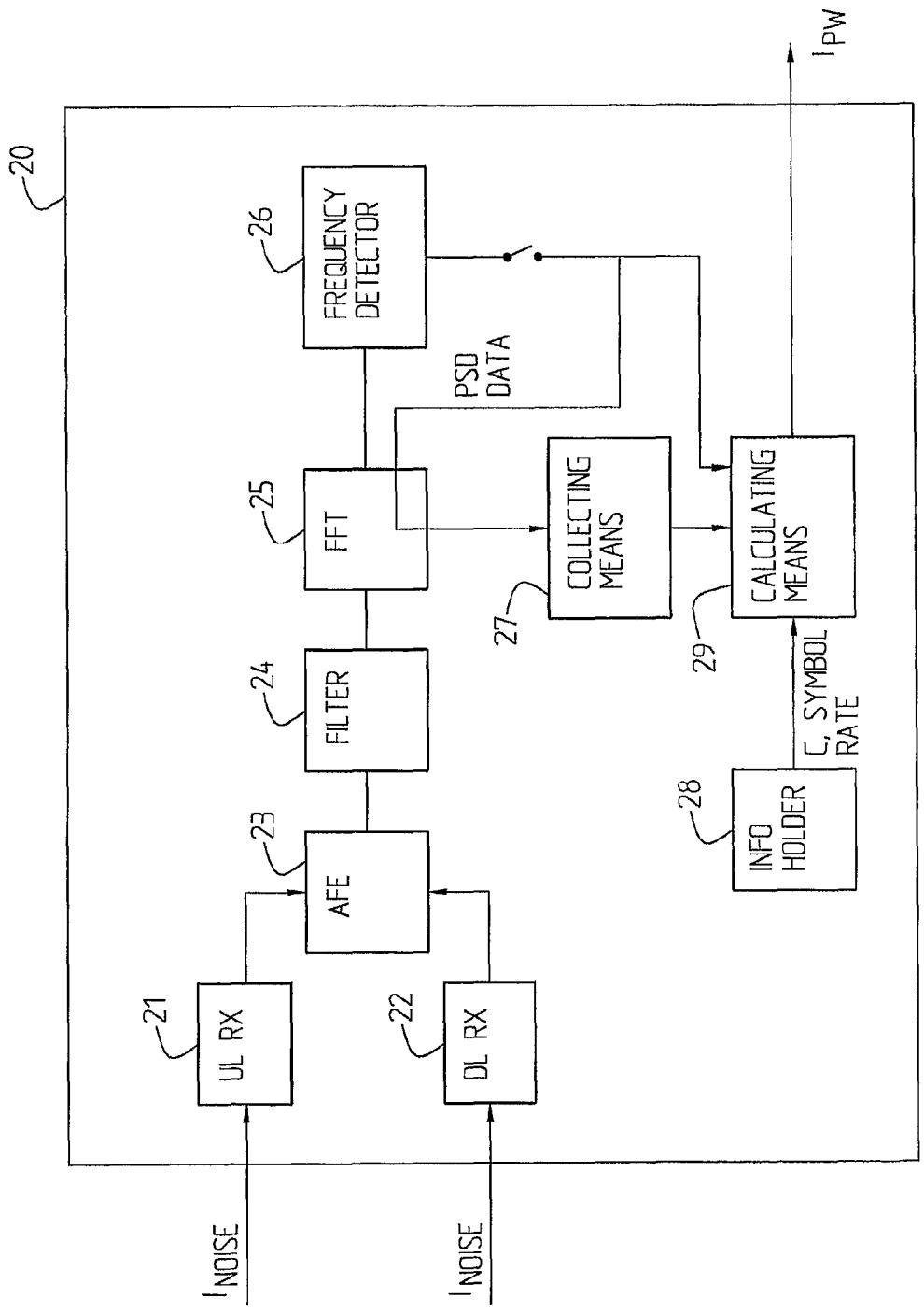
FIG. 2 is a schematical block diagram of a DSL transceiver in which the inventive concept is implemented according to a first embodiment.

FIG. 2 very schematically illustrates a DSL transceiver 20. Only those means or functions that are necessary for the functioning of the inventive concept are illustrated. The transceiver 20 comprises an upstream receiver 21, here indicated as UL RX (Uplink Receiver) and a downlink or downstream receiver DL RX 22. Both receivers are illustrated in the figure in order to indicate that the inventive concept is applicable to any direction of the received signal, i.e. the signal could be received from the DSL upstream receiver or the downstream receiver. The transmitters are not illustrated in the figure, since for the inventive concept, it is supposed that they are temporarily disabled in order to enable measurement of pure loop noise.

The transceiver comprises an analog front end AFE 23 with an analog component actually normally comprising the upstream and downstream receivers (for reasons of clarity shown as separate components here), a filter 24, particularly an RX-filter for removing frequency bands which are not interesting for the measurements to be performed, a fast Fourier transformation means 25 for converting from time domain to frequency domain. The FFT 25 comprises the spectrum analyzer of the transceiver 20 and it is here specifically connected to a frequency detector 26 detecting if an input signal comprises REIN. If it comprises REIN, the frequency of the REIN is determined, a switch (or similar functionality) is activated, information about the established frequency is provided to the calculation means 29 and the PSD data obtained from FFT 25 is input to collecting means 27, cf. FIG. 1, from where it is input to the calculation means 29 together with additional information, here seen as contained in information holder 28, and comprising information about the input constant C and the data symbol rate. In the calculation means 29 the pulse width of the REIN (if detected) is established and output, here indicated as $I_{pw}$. Thus, the connected loop power spectral density (PSD) maximum is measured over time. The PSD measurement will contain information regarding the spectral noise conditions existing on the loop. Depending on the requirements on storing capability and general data processing capability, the measurements may be limited in time such that only a short interval is observed or the time is extended such that the behavior during a longer time interval can be monitored. This is not illustrated in FIG. 2, but reference is made to FIG. 1 which specifically illustrates the time control means 6.

The measurement data, i.e. the PSD values, will be an array of PSD values each representing a discrete point in frequency marked up by the DMT modulation scheme (if this scheme is implemented). Thus, if repetitive electrical impulse noise (REIN) is injected, i.e. contained in the more or less pure noise signal, the loop is measured and the measurement data that is output ($I_{pw}$) will show the characteristics of the REIN in at least two different ways. First the REIN period can be observed, counting the occurrences over time, which is considered as a time domain analysis. This is here simply illustrated by means of the frequency detector 26 and it can be implemented in different ways, the main thing being that it is established if REIN is included in the noise signal and, secondly, that the frequency is determined. According to the inventive concept the pulse width can be observed by the interpreting the constructive/destructive interference due to the relation between the DMT symbol pace and the pulse width. As referred to above, if the symbol pace or symbol rate is known (and C), the pulse width can be estimated (by means of the calculation means) using the obtained measurement data.

The frequency detector 26, collecting means 27, information holder 28 and the calculating means 29 are here shown as provided in the transceiver. In alternative implementations all of, some of or one of said means may be provided separately, or in any combination, but in communication with the transceiver, i.e. externally thereof. Any variation is possible.

Figure 3:
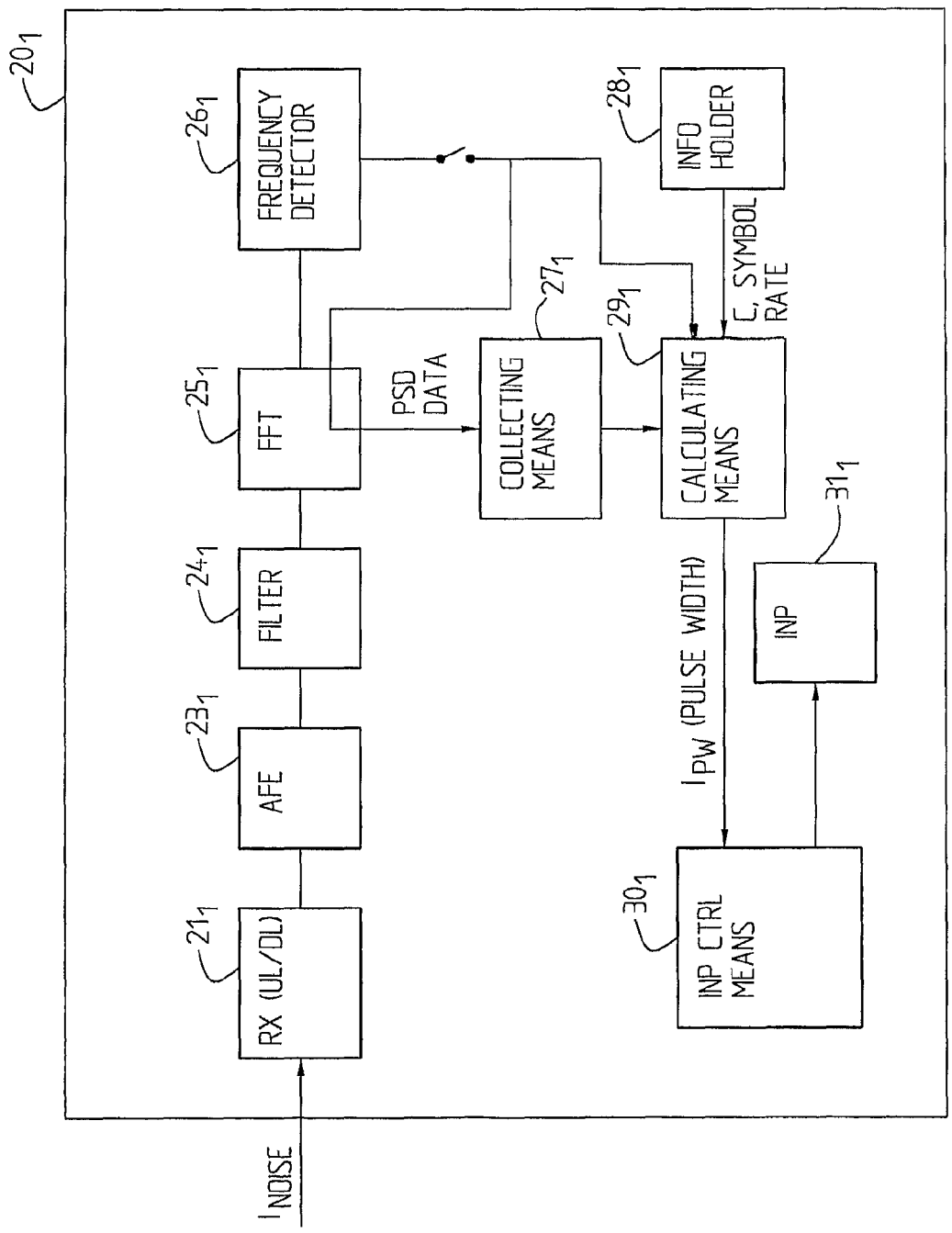
FIG. 3 shows a DSL transceiver in which the inventive concept is implemented in a particular embodiment.

FIG. 3 shows another embodiment of a transceiver $20_1$ substantially corresponding to the one of FIG. 2, but additionally including INP control means $30_1$ and INP $31_1$. Also here it is supposed that a more or less pure noise signal $I_{noise}$ is input to a receiver $21_1$, here illustrated as handling upstream and downstream reception is for reasons of simplicity and comprised by a communicating with means AFE $23_1$ which is connected to filtering means $24_1$ as discussed above. It comprises spectrum analyzing means comprising FFT $25_1$, frequency detector $26_1$ as also discussed above which, directly (not shown, cf. FIG. 2) if REIN is established via the FFT $25_1$ provides information about the frequency of the REIN to calculation means $29_1$. The FFT if REIN is detected, provides PSD data to collecting means $27_1$ which provides the data to the calculation means $29_1$ which using also the information from information holder $28_1$ (cf. FIG. 2), calculates the pulse width. Information about the pulse width is then provided to INP control means $30_1$ which are used to control the amount or degree of INP that should be applied by INP means $31_1$ to a DSL signal (not shown since application of INP on a DSL signal is known per se), the inventive feature being that the amount of INP can be controlled depending on the pulse width, which means that the amount of INP applied can be optimized. Even if the frequency detector, calculating means etc. are illustrated as included in the transceiver, they (one or more of them) may, be provided externally of the transceiver (cf. discussion with reference to FIG. 2).

Figure 4A:
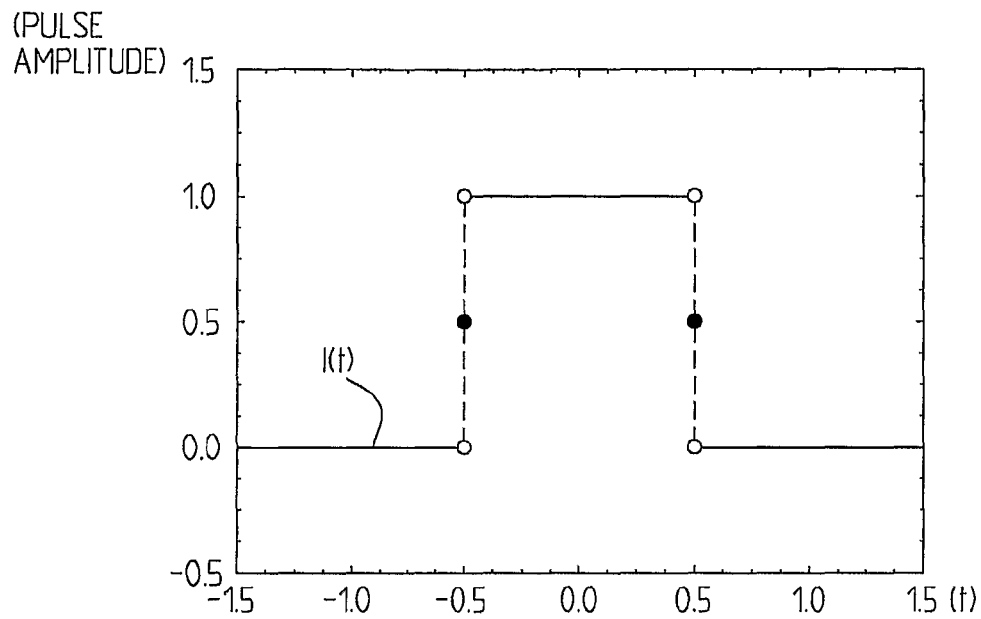
FIG. 4A is a diagram illustrating a time domain rectangular function which may be used as a model for a generic type of REIN pulse.
Figure 4B:
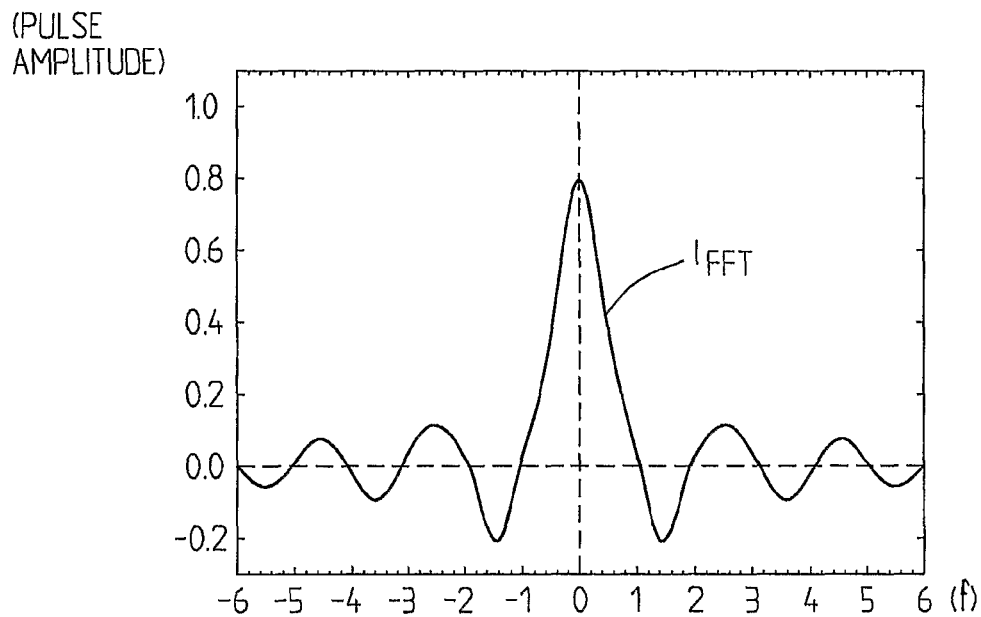
FIG. 4B is a diagram illustrating the frequency domain rectangular function of FIG. 4A exposed to a (fast) Fourier transform, resulting in a sinc function.

The relation between the, here, DMT data symbol rate and the pulse width describes the Fourier transform of the time domain signal transformed into frequency domain. A rectangular pulse or a time domain rectangular function, cf. I (t) in FIG. 4A creates an infinite sinc function in frequency domain cf. IFFT in FIG. 4B. Since e.g. any ADSL or VDSL type of receiver uses the Fourier transform in the receiving signal path, the time to frequency domain over a discrete-time Fourier transform, normally implemented as a fast Fourier transform (FFT), the transform $$X(w) = \sum_{n=-\infty}^{\infty} x[n]e^{-iwn}$$

will explain the signal behavior shown in FIG. 5 and FIG. 6 below.

The relation between the interference pattern in the received PSD measurement data and the injected REIN can be seen in FIG. 5 and FIG. 6 below.

Figure 5:
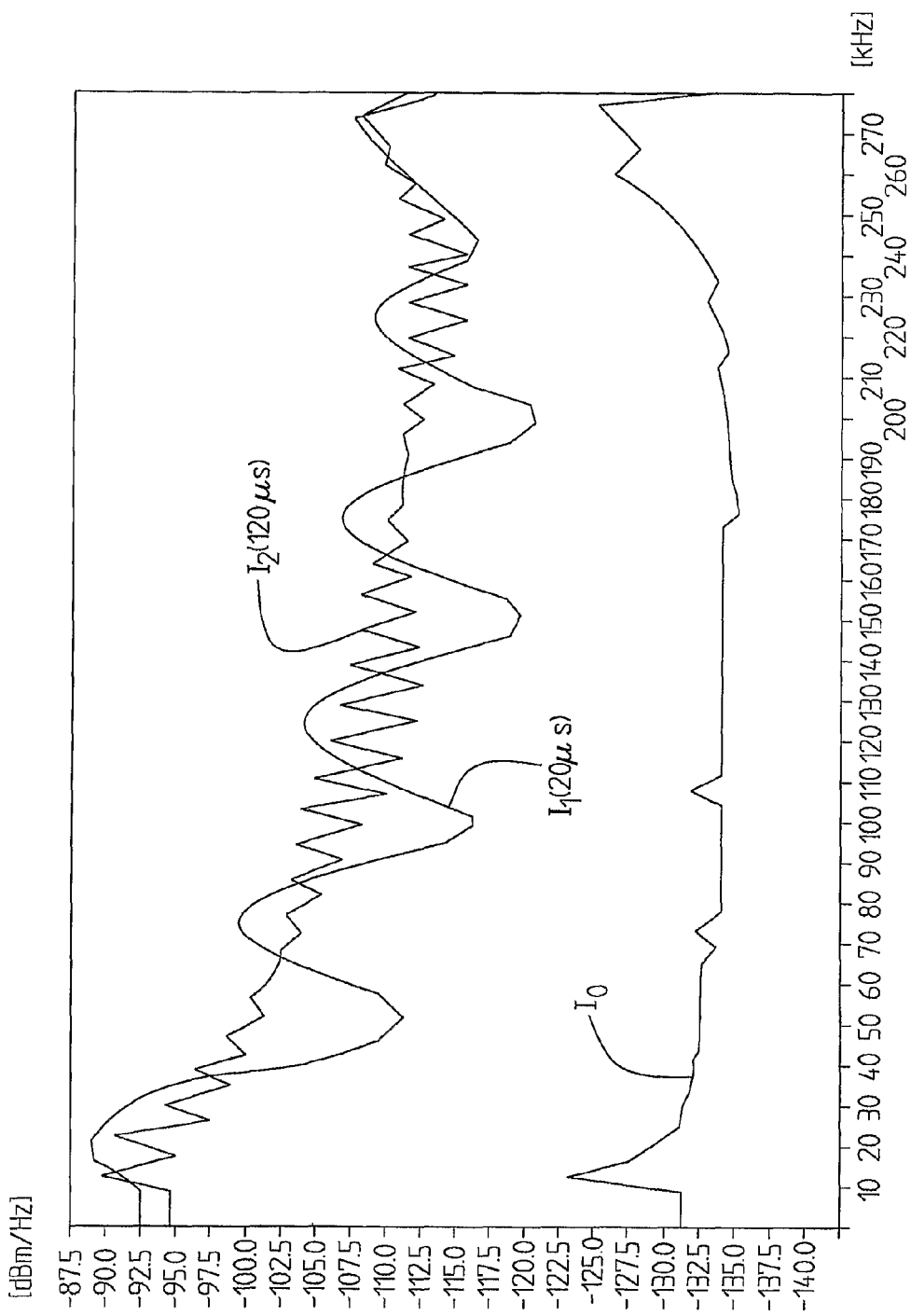
FIG. 5 is a diagram schematically illustrating three PSD measurements.

FIG. 5 particularly illustrates three PSD measurements, $I_0$ illustrates the Noise PSD level when there is no REIN injected or detected. $I_1$ illustrates the noise PSD levels for an injected or detected bipolar REIN which is injected at 100Ω, 100 mW, 50 pps, 20 μs pulse width and $I_2$ illustrates detected REIN injected at 100Ω, 100 mV, 50 pps, with a pulse width of 120 μs.

The linear relation between the REIN pulse width and the data symbol rate can be found empirically.

Figure 6:
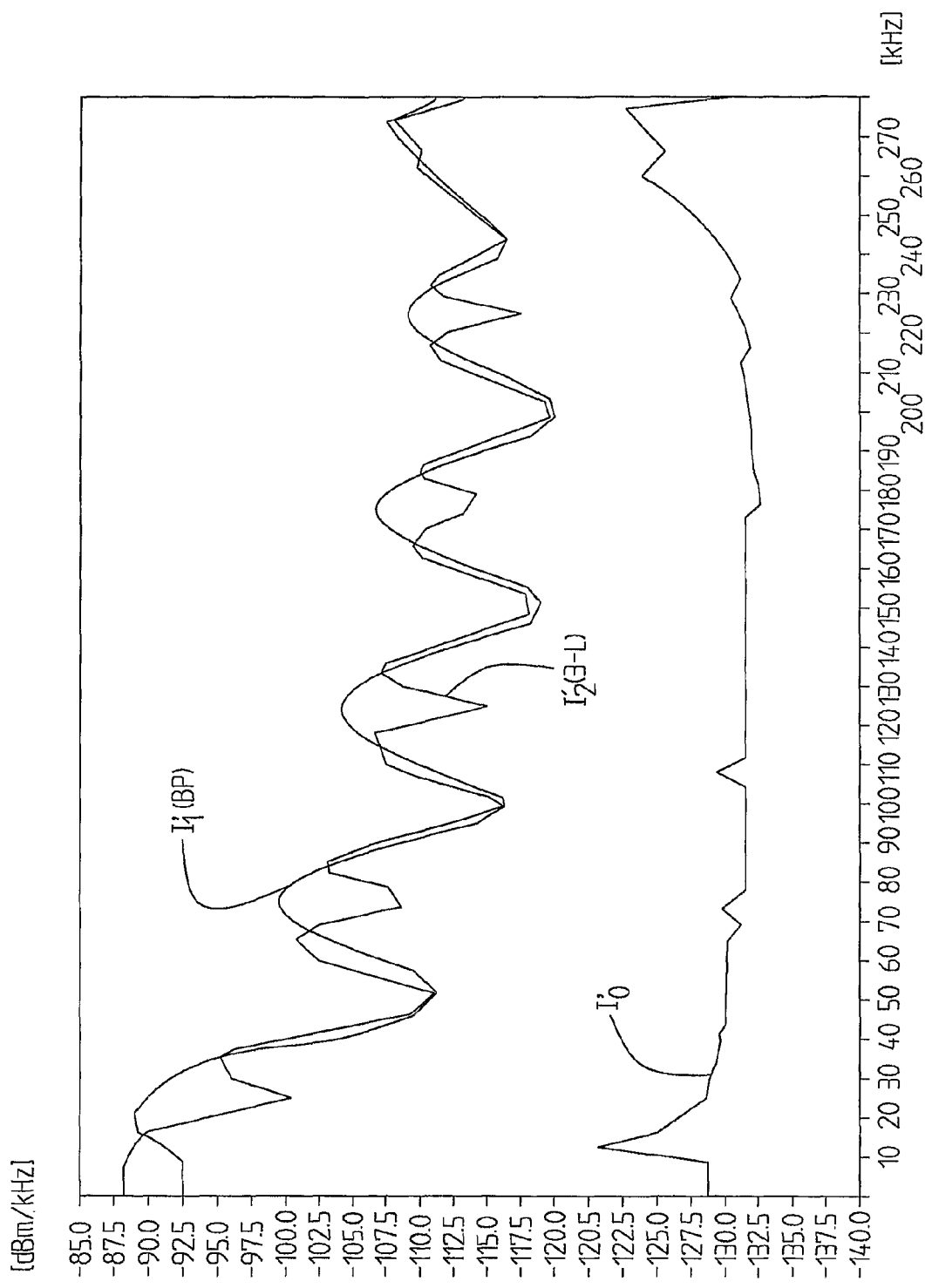
FIG. 6 is another diagram indicating three PSD measurements.

Empirically the linear relation can be expressed as:
pulse width=C/frequency spacing*DSL symbol rate, wherein C is a composition of constant components related to the DSL transceiver and the frequency spacing as a span in frequency for the interference period, as can be seen in FIG. 5 (and FIG. 6). This relation is according to the inventive concept used together with a frequency detector for detection of the periodic behavior of the PSD measurement data to calculate an estimate of the REIN pulse width. It can be noted that the periodical behavior in the PSD measurement is not affected by changes in the pulse frequency. It can be established by changing the pulse frequency and maintaining the pulse width and the amplitude (not shown). Furthermore more advanced types of REIN can be detected, such as for example 3-level signals etc. The limitation for such a detection or characterization of the impulse noise pulse width is due to the symbol rate that is used by the DSL transceiver. For very large pulse widths, the pulse width may cohere with the symbol rate. Typically, for ADSL this will occur at a pulse width of about 250 μs (as referred to above, the ADSL symbol rate is 4 kHz). For VDSL the symbol rate can be configured to 4 or 8 kHz. For e.g. OFDM it can vary, but it is always known to the receiver (and hence to the arrangement according to the invention).

FIG. 6 is a diagram illustrating three PSD measurements wherein $I_0'$ illustrates measurements when no REIN is injected or detected. $I_1'$ (BP) illustrates the noise PSD level at detection or injection of bipolar REIN at 100Ω, 100 mV, 50 pps, and a 20 μs pulse width whereas $I_2'$ (3-L) illustrates the noise PDS level for an injected three level REIN injected at 100Ω, 100 mV, 50 pps, 20 μs pulse width.

Figure 7:
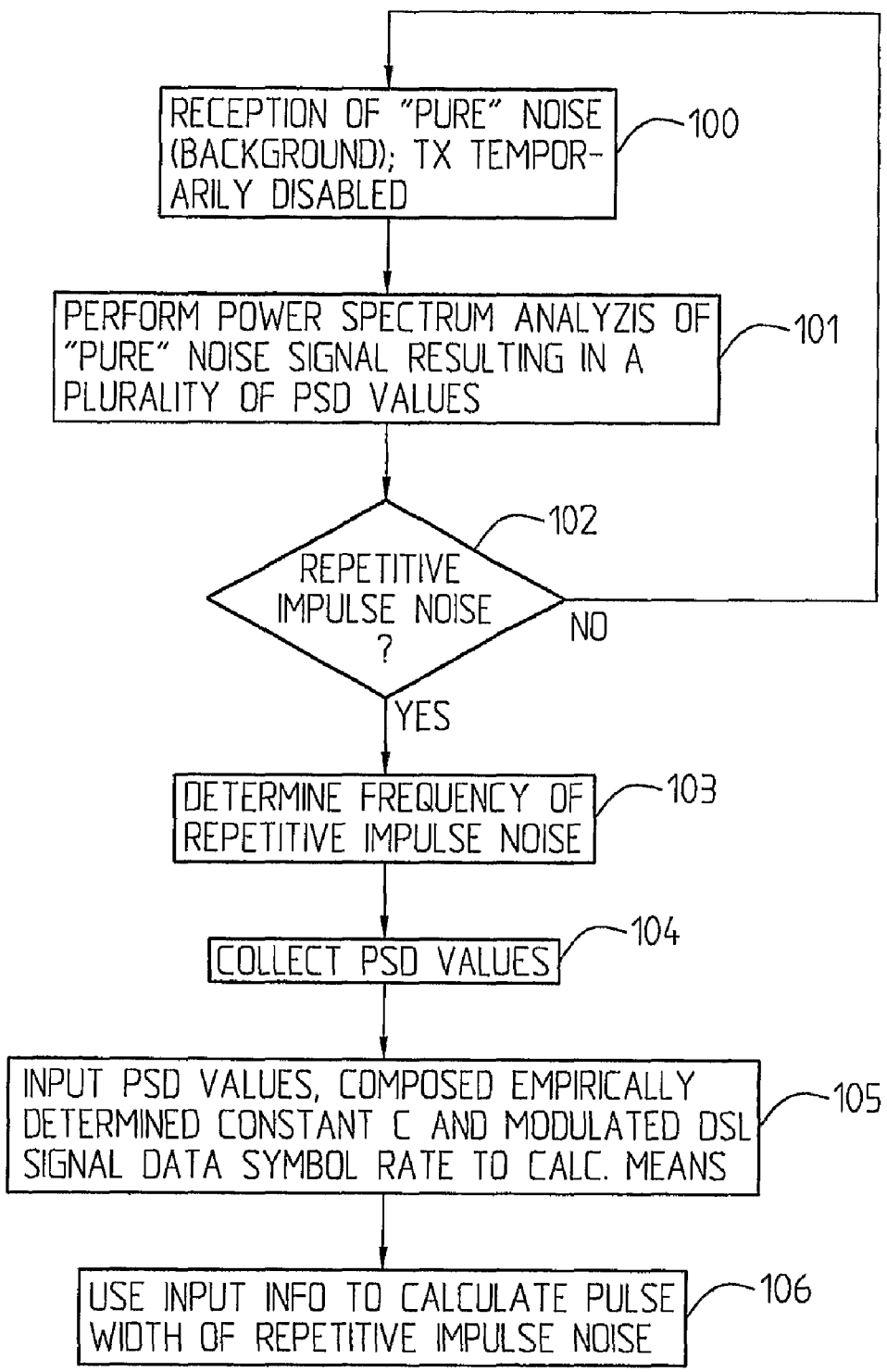
FIG. 7 is a simple flow diagram describing one implementation of the inventive concept.

FIG. 7 is a schematical flow diagram describing one implementation of the inventive procedure. It is supposed that in an arrangement or transceiver "pure" noise or a background signal is received, e.g. achieved in that the functionality of a DSL transceiver is disabled, 100. A power spectrum analysis of the "pure" noise signal is performed resulting in a plurality of PSD values, 101. It is established if repetitive impulse noise is present, 102. If not, the procedure ends as far as the inventive concept is concerned, illustrated by means of the loop back to step 100 above. If however repetitive impulse noise is detected, the frequency of the repetitive impulse noise is determined, 103, and the PSD values are collected as described above, 104. The PSD values are input and the composed empirically determined constant C and the modulated DSL signal data symbol rate are provided to the processing or calculation means, 105. The information, for example C and the symbol rate, may already have been stored in the calculation means, and are used with the PSD values to calculate the pulse width of the repetitive impulse noise, 106.

Figure 8:
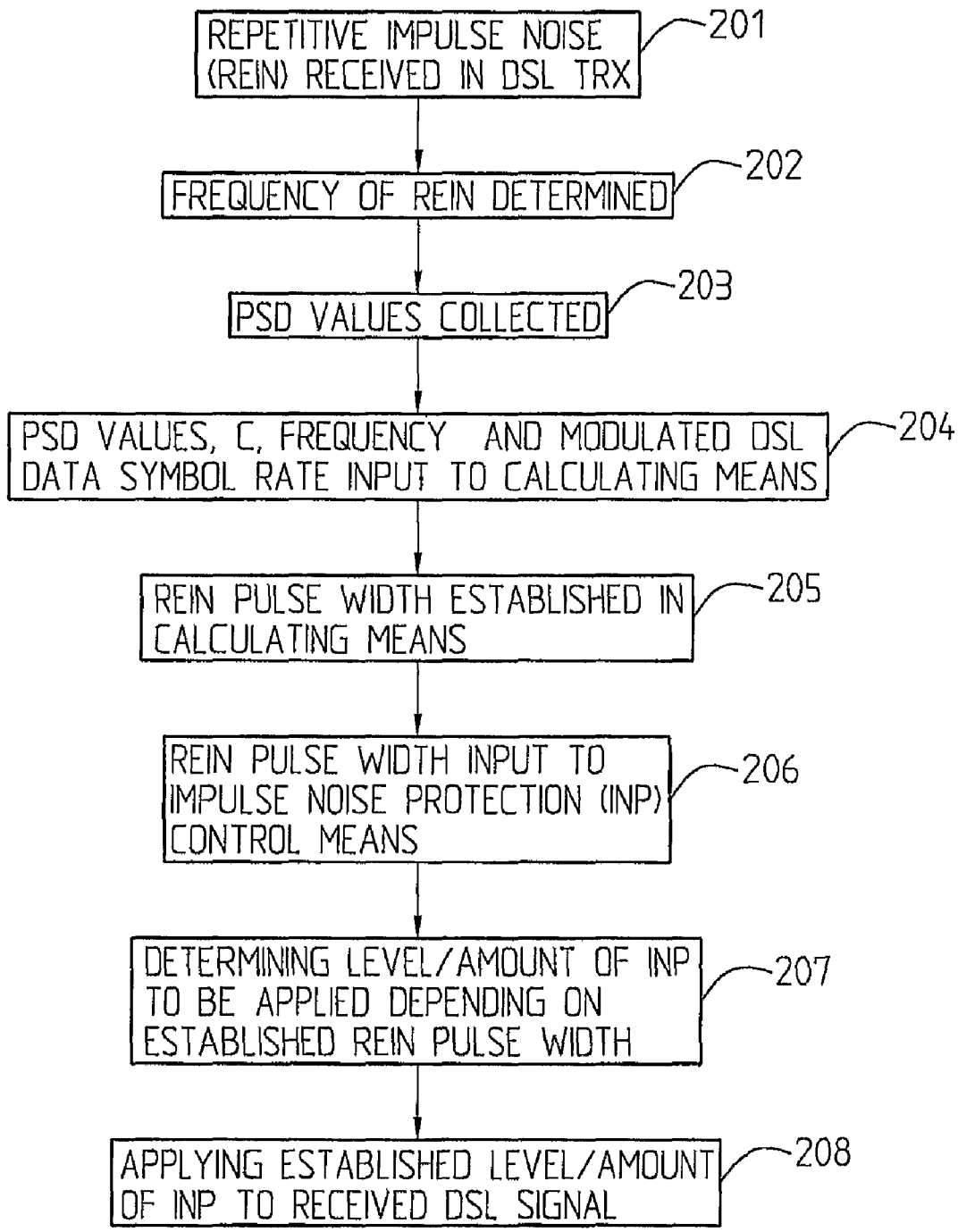
FIG. 8 is a flow diagram describing another advantageous implementation of the inventive concept.

FIG. 8 is a schematical flow diagram describing an example of how the inventive concept can be used. As in FIG. 7, it is supposed that repetitive impulse noise is received in a DSL TRX, 201. Thus, in the figure the reception and detection etc. is not illustrated but it is supposed that REIN actually is present. The frequency of the REIN is determined, 202, and the PSD values are collected, 203. The PSD values and the frequency are input to the calculating means which also receives or contains information about C and the modulated DSL data symbol rate, 204. As discussed above the REIN pulse width is established in the calculating means, 205, and subsequently the REIN pulse width is input to impulse noise protection (INP) control means, 206. Based on the established REIN pulse width, the level or amount of INP to be applied is determined, 207, and the established level or the amount of INP is applied to an input or generated DSL signal, 208.

This is very advantageous since as the DSL services are becoming more advanced and exploited, with high requirements on the transmission, it becomes more and more important to know the characteristics in detail of the loop carrying DSL transmission. It is extremely advantageous to be able to characterize repetitive impulse noise in terms of pulse width, which has been realized to be an important parameter in the process of selecting the level of impulse noise protection specified in current DSL standards. Extremely advantageous is also the ability to, if present, use an already in-place DSL transceiver hardware as a spectrum analyzer for measuring PSD levels over current DSL spectrum. Through implementation of the inventive concept the provisioning of DSL services is improved, particularly on loops with a high risk of being exposed to impulse noise. Furthermore troubleshooting on DSL signals can be considerably improved by means of detecting the severity of impulse noise using information about the pulse width of the impulse noise.

It should be clear that the invention is not limited to the specifically illustrated embodiments, but that it can be varied in a number of ways within the scope of the appended claims.

The invention claimed is:

1. A Digital Subscriber Line (DSL) transceiver for transmitting and receiving uplink and downlink DSL signals with a given data symbol rate over Digital Subscriber Lines on a twisted pair cable, the transceiver comprising:
   a DSL receiver configured to temporarily exclude reception of the DSL signals;
   a spectrum analyzer configured to measure power spectral density (PSD) measurements of a background, substantially pure noise signal, and to determine whether repetitive impulse noise is present in the background noise signal, wherein the PSD values are marked up by a Discrete MultiTone modulation scheme used on the DSL-signal;
   a frequency detector configured to detect a frequency of the repetitive impulse noise, when the repetitive impulse noise is present;
   a processing circuit configured to calculate a pulse width of the repetitive impulse noise using a relationship between the given data symbol rate and the frequency of the repetitive impulse noise, wherein the pulse width is given by C/(frequency spacing of the signal measurements multiplied by the given data symbol rate), where C is a composition of constant components related to the DSL transceiver and the frequency spacing as a span in frequency for an interference period;
   an impulse noise protector configured to apply impulse noise protection to the DSL signals, the impulse noise protection including Forward Error Correction (FEC) coding and spreading of errors in time utilizing interleaving of various depths; and
   a protection controller configured to control the impulse noise protector to minimize application of impulse noise protection to the DSL signals, depending on the calculated pulse width.

2. The DSL transceiver according to claim 1, wherein the DSL signals comprise ADSL signals, and the given data symbol rate is 4 kHz.

3. The DSL transceiver according to claim 1, wherein the processing circuit includes a timer configured to control an observation time interval during which the/each PSD measurement is performed.

4. The DSL transceiver according to claim 1, wherein the PSD measurements comprise an array of PSD values, one for each discrete point in frequency.

5. The DSL transceiver according to claim 1, wherein the processing circuit is configured to calculate the pulse width by interpreting an interference pattern of destructive and constructive interference representing a relationship between the given data symbol rate and the pulse width.

6. The DSL transceiver according to claim 5, further comprising:
   an Analog Front End for signal reception;
   an A/D-converter;
   an RX-filter for filtering out measurement data with a frequency outside a frequency band to be observed; and
   a converter configured to perform a fast Fourier transformation from the time domain to the frequency domain of the received noise signal.

7. The DSL transceiver according to claim 6, further comprising a data collector configured to collect and hold measurement data transformed to the frequency domain;
   wherein the processing circuit is configured to calculate the pulse width as a function of the frequency spacing of the measurement data and the given data symbol rate.

8. A method of monitoring noise received in a twisted pair cable that transfers data comprising Digital Subscriber Line (DSL) signals with a given data symbol rate, the method comprising the steps of:
   temporarily excluding reception of the DSL signals;
   performing by a spectrum analyzer, a power spectrum analysis of a pure noise signal to provide a number of power spectral density (PSD) measurements, wherein the PSD values are marked up by a Discrete MultiTone modulation scheme used on the DSL-signal;
   determining by the spectrum analyzer from the PSD measurements, whether the pure noise signal includes repetitive impulse noise;
   upon determining that the pure noise signal includes repetitive impulse noise:
   determining by a frequency detector, a frequency of the repetitive impulse noise;
   calculating by a processing circuit, a pulse width of the impulse noise signal using the given data symbol rate and the frequency of the impulse noise signal, wherein the pulse width is given by C/(frequency spacing of the signal measurements multiplied by the given data symbol rate), where C is a composition of constant components related to the DSL transceiver and the frequency spacing as a span in frequency for an interference period;
   determining by an impulse noise protection controller, a level of impulse noise protection to be applied to the DSL signals based on the calculated pulse width of the repetitive impulse noise; and applying by an impulse noise protector, impulse noise protection to the DSL signals as controlled by the impulse noise protection controller, the impulse noise protection including Forward Error Correction (FEC) coding and spreading of errors in time utilizing interleaving of various depths.

\* \* \* \* \*

UNITED STATES PATENT AND TRADEMARK OFFICE
CERTIFICATE OF CORRECTION

PATENT NO. : 8,295,192 B2  
APPLICATION NO. : 12/524595  
DATED : October 23, 2012  
INVENTOR(S) : Rosenberg Page 1 of 1

It is certified that error appears in the above-identified patent and that said Letters Patent is hereby corrected as shown below:

On the Title Page, in Field (54), and Column 1, Line 2, in Title, delete "SUBSCRIBE" and insert -- SUBSCRIBER --, therefor.

In Fig. 7, Sheet 7 of 8, for Tag "101", in Line 1, delete "ANALYZIS" and insert -- ANALYSIS --, therefor.

In Column 1, Line 63, delete "G.992.3. 992.5," and insert -- G.992.3, 992.5, --, therefor.

In Column 5, Line 14, delete "an RX-filter" and insert -- a RX-filter --, therefor.

In Column 6, Line 43, delete "an RX-filter" and insert -- a RX-filter --, therefor.

In Column 10, Line 30, in Claim 6, delete "an RX-filter" and insert -- a RX-filter --, therefor.

In Column 10, Line 55, in Claim 8, delete "noise:" and insert -- noise; --, therefor.

Signed and Sealed this  
Nineteenth Day of March, 2013

Teresa Stanek Rea  
*Acting Director of the United States Patent and Trademark Office*